March 17, 1964   W. C. GERBER   3,125,212
AUTOMOBILE DOOR-HUNG WASTE RECEPTACLE
Filed Sept. 11, 1962   2 Sheets-Sheet 1
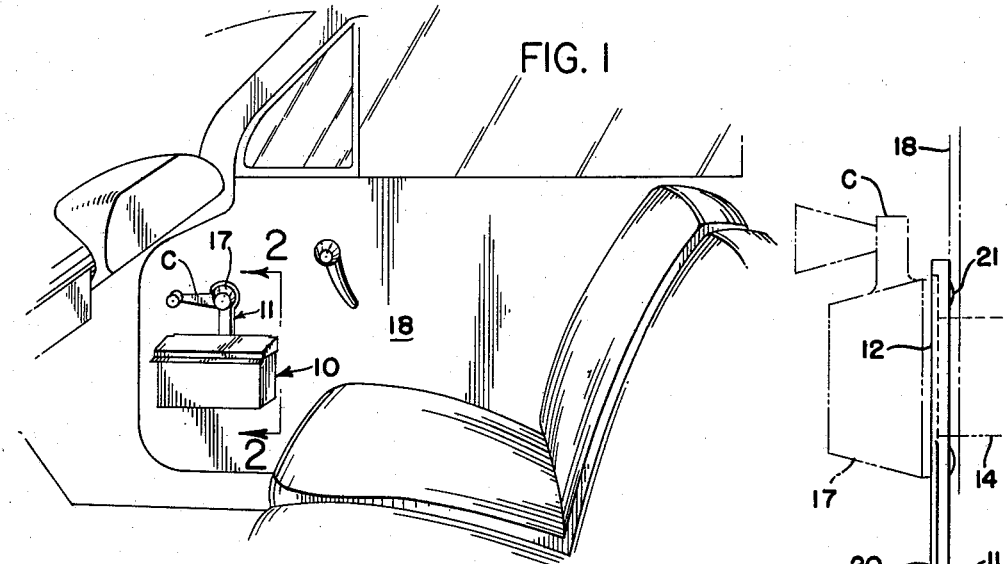
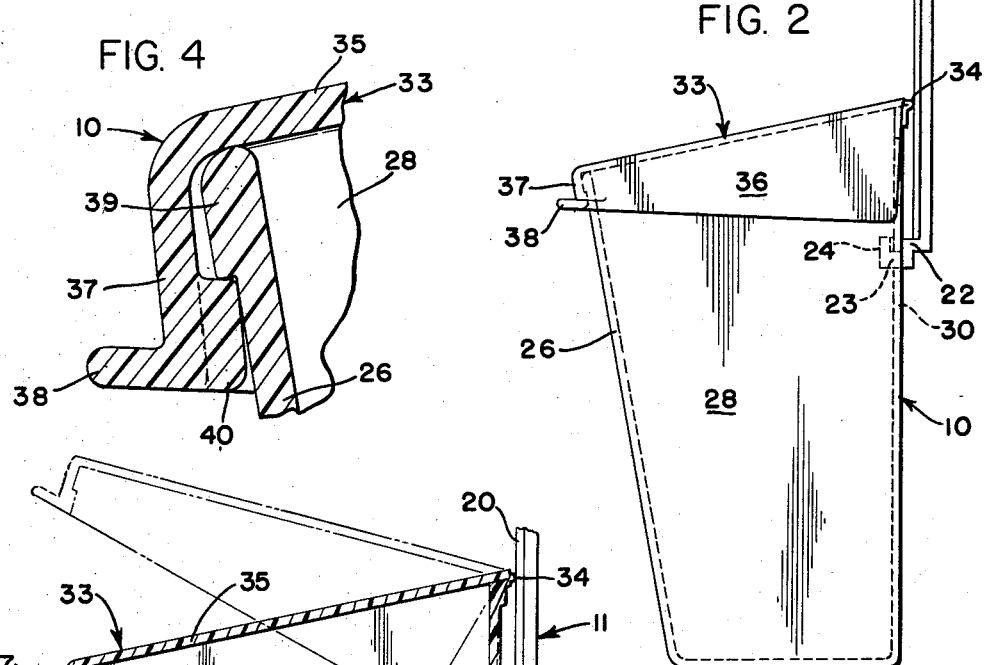
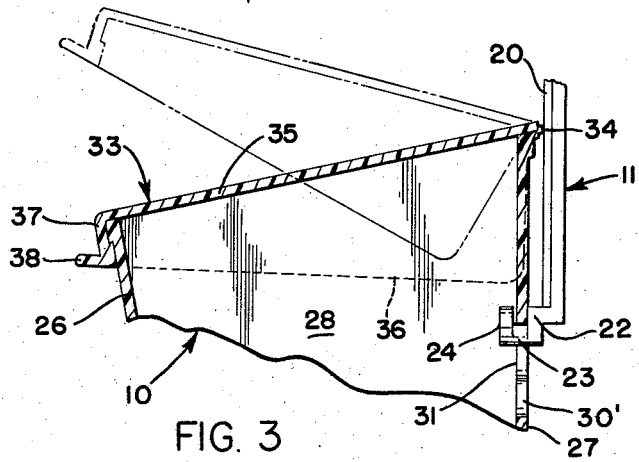
INVENTOR.
WILLIAM C. GERBER
BY
ATTORNEYS March 17, 1964   W. C. GERBER   3,125,212
AUTOMOBILE DOOR-HUNG WASTE RECEPTACLE
Filed Sept. 11, 1962   2 Sheets-Sheet 2
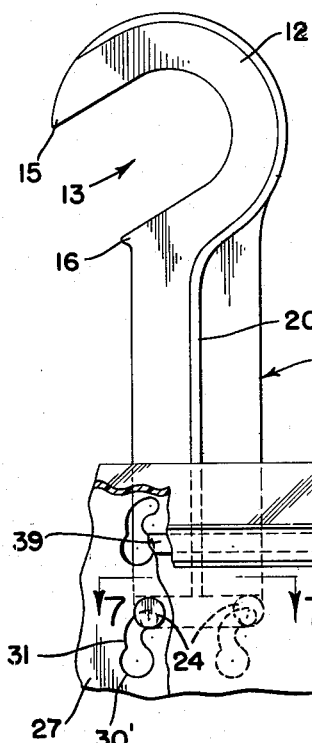
FIG. 5
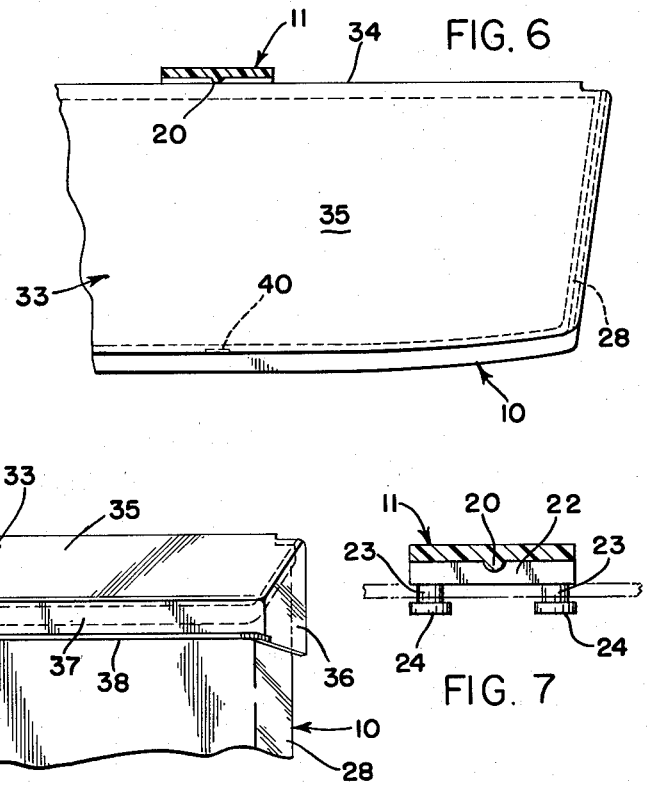
FIG. 6
FIG. 7
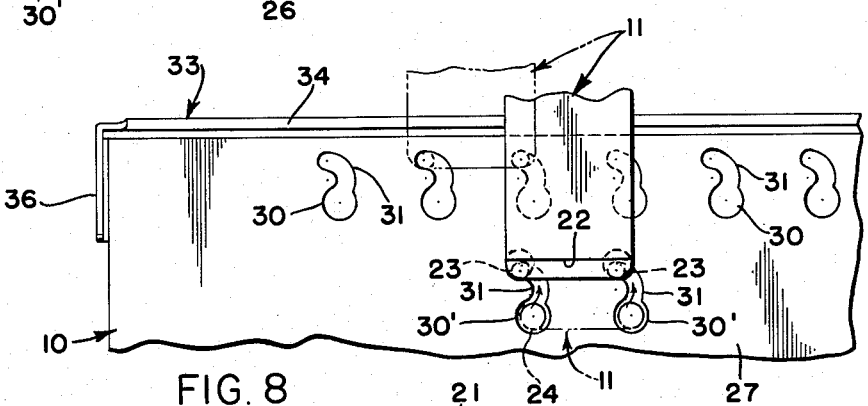
FIG. 8
FIG. 9
INVENTOR.
WILLIAM C. GERBER
BY Hamilton & Cook
ATTORNEYS

3,125,212
AUTOMOBILE DOOR-HUNG WASTE RECEPTACLE
William C. Gerber, Dalton, Ohio, assignor to Rubbermaid Incorporated, Wooster, Ohio
Filed Sept. 11, 1962, Ser. No. 222,808
4 Claims. (Cl. 206—19.5)

The invention relates generally to waste receptacles for use in automobiles, and more particularly to a waste receptacle adapted for ready hanging on the inside of a conventional automobile door.

Prior waste receptacles for automobiles have been provided with clamping devices intended to detachably secure them to the bottom of the instrument panel or to the top of a wall panel under one end of the instrument panel. Since the receptacle must be emptied frequently, it is essential that it be easily detached when desired but be securely held against inadvertent detachment.

The difficulty with such prior devices is they do not fit properly in the various makes of automobiles because the design and construction of various automobiles around and adjacent to the instrument panel vary greatly.

As a consequence, the receptacle may be easily jarred or knocked loose from its support, causing spilling of the receptacle contents, or it may be difficult to detach and replace, depending upon the particular make of automobile in which it is used.

Another disadvantage of prior construction is that mounting the receptacle under the instrument panel makes it difficult or unhandy to provide a cover which is easily opened and closed, and it is very desirable to keep the receptacle covered when not in use.

It is an object of the present invention to provide an improved automobile waste receptacle having a hanger which is readily hung on the front inside portion of the front door of practically all conventional makes of automobiles so as to be positioned out of the way and substantially under the instrument panel.

Another object is to provide an improved combined receptacle and hanger in which the receptacle is quickly and easily detached for emptying and easily remounted securely, without the use of tools or implements.

A further object is to provide an improved receptacle which has an easily operated and convenient cover which is closed except when the receptacle is in use.

These and other objects are accomplished by the improved combined waste receptacle and hanger comprising the present invention, a preferred embodiment of which is shown and described herein by way of example. Various modifications and changes in details of construction are embodied within the scope of the appended claims forming part hereof.

In general, the improved combined receptacle and hanger comprises a hanger strap having a top hook for engaging the window crank pintle on an automobile door and bottom projections for detachably engaging in keyhole slots in the back wall of a receptacle, said receptacle having a cover connected thereto at one edge by a plastic flex-type hinge and normally frictionally engaged at its opposite edge to the cover with a snap fit.

Referring to the drawings:

FIG. 1 is a perspective view showing the improved combined receptacle and hanger mounted on the inside of the right front door of an automobile.

FIG. 2 is an enlarged side elevation of the receptacle and hanger showing the window crank pintle on which it is hung in phantom lines.

FIG. 3 is a fragmentary enlarged sectional view showing the hinged cover in closed position and an open position in phantom lines.

FIG. 4 is a further enlarged fragmentary sectional view of the front end of the cover engaged with the front edge of the receptacle.

FIG. 5 is a front elevation, partly broken away, of the receptacle and hanger.

FIG. 6 is a partial plan sectional view thereof.

FIG. 7 is a fragmentary sectional view on line 7—7 of FIG. 5.

FIG. 8 is a partial rear elevation showing the hanger pins engaged in the keyhole slots of the receptacle.

FIG. 9 is a rear elevation of the hook at the top of the hanger.

Referring to FIG. 1, the improved receptacle 10 and hanger 11 are shown mounted on the window crank pintle of a right front door of an automobile having only one window crank C. On doors having an additional crank for the forward ventilator window, the receptacle would ordinarily be hung on the forward crank so as to be in an out-of-the-way position.

Referring to FIGS. 2 and 5, the top end of the hanger strap 11 has a hook 12 with a downwardly inclined opening 13 adapted to fit over the window crank pintle 14, and the inner edges of the opening are tapered to form relatively thin points 15 and 16 which slide easily behind crank hub 17 or an escutcheon plate (not shown) interposed between the hub and the interior door panel 18. Preferably, the hanger has a central reinforcing rib 20 on its outer surface which extends around the outer edge of the hook 12 as shown. The inner surface of the hook 12 preferably has sharp edged teeth or serrations 21 which engage the surface of the door panel and prevent swinging of the hanger and receptacle when the auto is in motion.

The lower end of the hanger strap 11 is preferably provided with a forwardly extending angular flange 22, and two laterally spaced pins 23 extend forwardly from said flange and have preferably circular heads 24 on their outer ends. The distance between the angular flange 22 and the heads 24 is slightly greater than the thickness of the rear wall of the receptacle for a purpose to be described.

The improved receptacle 10 is preferably substantially rectangular with the front or outer wall 26 slightly inclined upwardly away from the rear or inner wall 27, and the upper edge of the front wall below the upper edge of the rear wall so that the top of the receptacle inclines downwardly away from the door on which it is mounted. Preferably, the side walls 28 and the rear wall 27 are substantially vertical when the receptacle is hung on a door.

The rear wall 27 of the receptacle is provided with a plurality of keyhole slots 30 spaced laterally on centers the same distance as the headed pins 23 on the hanger strap. An upper row of slots 30 is shown and a single pair of slots 30' is shown below the two central slots 30 in the upper row. This arrangement enables the relative location of the receptacle on the door to be varied. Obviously, the number and arrangement of slots may be varied so long as there are laterally spaced pairs to register with the pins 23. By having a pair of pins engaging a pair of slots the receptacle may be solidly hung in an off-center position.

The lower ends of the slots are substantially circular and slightly larger in diameter than the heads 24, as indicated in FIG. 8, so that the heads are easily entered in a selected pair of slots, and the heads will engage behind the edges of the narrow curved parts 31 of the slots as the receptacle is moved downwardly. The laterally curved portions 31 cause the pins to become locked in the upper ends of the slots against dislodgement if the receptacle is jarred up and down in use.

The receptacle 10 may be plastic material such as polypropylene, and the cover 33 is also of the same material and preferably molded integral therewith. As shown, the hinge for the cover is preferably formed by providing a relatively thin folding section or groove 34 in the top wall 35 of the cover adjacent to and substantially coextensive with the upper edge of the rear wall 27. This section 34 provides a flex type hinge about which the cover can be folded or swung, as indicated in FIG. 3, and it is a known property of this material that it will flex in this manner many thousands of times before failure, and thus outwear the receptacle itself.

The top wall 35 is downwardly inclined from the hinge section 34 to fit the inclined top edge of the receptacle, and has vertical side walls 36 for overlapping the side walls 28 of the receptacle. A depending front flange 37 overlaps the upper edge of front wall 26 of the receptacle when the lid is closed, and the flange terminates in an outturned lip 38 to aid in lifting the cover to open position. The hinge section 34 may bear against the rib 20 of the hanger strap, as shown, to stabilize the receptacle as the cover is opened and closed.

As shown in FIG. 4, the upper edge of front wall 26 has an exterior rim bead 39, and a latch lug 40 is provided on the interior of the front flange 37 of the cover to frictionally engage under the rim bead 39 with a snap fit (permitted by the inherent resiliency of the rim bead 39) for detachably locking the cover in closed position.

The improved receptacle is readily hung on practically all makes of automobile doors by sliding the hanger hook over the window crank pintle of the door. The receptacle can be positioned out of the way by selecting a desired pair of keyhole slots to be engaged by the pins on the hanger, and can easily be removed and replaced in the same position when emptying the contents of the receptacle, without using tools or implements of any kind. The improved cover is easily opened and closed and the snap fit keeps it closed regardless of bumps or jars when in use.

What is claimed is:

1. A combined waste receptacle and hanger for an automobile door comprising a receptacle having a front and a rear wall, said rear wall having keyhole slots, a hanger strap having projecting pins at its bottom end detachably engaged in said slots, and a hook at the top of said strap adapted for detachably engaging the window crank pintle of an automobile door for supporting said receptacle thereon, a cover for the receptacle, a plastic flex-type hinge connecting said cover to the upper edge of said rear wall and normally abutting said hanger strap, and said cover normally frictionally engaging the upper edge of said front wall with a snap fit.

2. A combined waste receptacle and hanger for an automobile door comprising a receptacle having a front and a rear wall, said rear wall having keyhole slots with their lower portions enlarged and their upper portions curved laterally, a hanger strap having headed pins at its bottom end adapted to enter said enlarged slot portions and engage behind said curved portions to detachably lock said receptacle, a hook at the top of said strap adapted for detachably engaging the window crank pintle of an automobile door for supporting the receptacle thereon, a cover for the receptacle, a plastic flex-type hinge connecting said cover to the upper edge of said rear wall and normally abutting said hanger strap, and said cover normally frictionally engaging the upper edge of said front wall with a snap fit.

3. A combined waste receptacle and hanger for an automobile door comprising a plastic receptacle having a front wall having a rim bead at its upper edge and a rear wall, said rear wall having keyhole slots, a hanger strap having projecting pins at its bottom end detachably engaged in said slots, a hook at the top of said strap for detachably engaging the window crank pintle of an automobile door for supporting said receptacle thereon, a plastic cover for the receptacle, a flex-type hinge connecting said cover to the upper edge of said rear wall and integral with said cover and wall, and said cover having a latch lug normally engaging under the rim bead of said front wall with a snap fit.

4. A combined waste receptacle and hanger for an automobile door comprising a plastic receptacle having a front wall having a rim bead at its upper edge and a rear wall, said rear wall having keyhole slots with their lower portions enlarged and their upper portions curved laterally, a hanger strap having headed pins at its bottom end adapted to enter said enlarged slot portions and engage behind said curved portions to detachably lock said receptacle, a hook at the top of said strap for detachably engaging the window crank pintle of an automobile door for supporting said receptacle thereon, a plastic cover for the receptacle, a flex-type hinge connecting said cover to the upper edge of said rear wall and integral with said cover and wall, and said cover having a latch lug normally engaging under the rim bead of said front wall with a snap fit.

References Cited in the file of this patent

UNITED STATES PATENTS

| 1,499,452 | Gay | July 1, 1924 |
| 1,571,762 | Driscoll | Feb. 2, 1926 |
| 1,915,958 | Skirrow | June 27, 1933 |
| 2,235,741 | Ford | Mar. 18, 1941 |
| 2,920,670 | Mohlmann | Jan. 12, 1960 |
| 2,926,834 | Kaslow | Mar. 1, 1960 |
| 3,059,374 | Bernay | Oct. 23, 1962 |